United States Patent [19]

Marsh et al.

[11] E Patent Number: Re. 31,668

[45] Reissued Date of Patent: Sep. 11, 1984

[54] LOAD SURVEY RECORDER FOR MEASURING ELECTRICAL PARAMETERS

[75] Inventors: Norman F. Marsh, Auburn; Gary W. Morand, Springfield; David G. Sokol, Divernon, all of Ill.

[73] Assignee: Sangamo Weston, Inc., Norcross, Ga.

[21] Appl. No.: 713,842

[22] Filed: Aug. 12, 1976

Related U.S. Patent Documents

Reissue of:

[64] Patent No.: 3,829,772
Issued: Aug. 13, 1974
Appl. No.: 352,551
Filed: Apr. 19, 1973

[51] Int. Cl.[3] ..... G01R 13/04

[52] U.S. Cl. ..... 324/113; 324/157; 360/6

[58] Field of Search ..... 360/6, 5; 346/14 MR, 346/20, 33 M; 361/88, 89; 324/110, 137, 113, 114, 142, 102; 340/253 C, 248 B; 235/151.31

[56] References Cited

U.S. PATENT DOCUMENTS

| | | | |
|---|---|---|---|
| 3,127,594 | 3/1964 | Roe et al. | 324/137 |
| 3,148,329 | 9/1964 | Lenahan | 346/14 MR |
| 3,401,395 | 9/1968 | Neher | 324/113 |
| 3,500,431 | 3/1970 | Baskin | 360/6 |
| 3,678,484 | 7/1972 | Maxwell | 324/113 |
| 3,826,982 | 7/1974 | McClelland | 324/113 |

FOREIGN PATENT DOCUMENTS

| | | | |
|---|---|---|---|
| 47-12497 | of 1972 | Japan | 360/6 |

*Primary Examiner*—Vincent P. Canney
*Attorney, Agent, or Firm*—Dale Gaudier

[57] ABSTRACT

A survey recorder for measuring electrical loads and providing a magnetic tape record of data with time reference signals in format capable of providing computer compatible information. The data recording circuit utilizes a light emitting diode with a phototransistor to determine each quantum measurement by the meter, and a trigger circuit driven by the phototransistor feeds a solid state divider circuit which is programmable to provide various I/O pulse ratio outputs to the data recording head. A power outage circuit detects outages which are greater than a predetermined duration and provides distinctive pulses to a time recording circuit to effect a recognizable format on the magnetic tape which identifies the power outage.

26 Claims, 8 Drawing Figures

SURVEY RECORDER CIRCUIT 10

LOAD SURVEY RECORDER FOR MEASURING ELECTRICAL PARAMETERS

Matter enclosed in heavy brackets [ ] appears in the original patent but forms no part of this reissue specification; matter printed in italics indicates the additions made by reissue.

BACKGROUND OF THE INVENTION

The electrical utility field has in recent years increased its use of recording devices which are capable of automatically providing computer-compatible information relating to the use and operation of the electrical distribution systems which supply power to the ultimate consumer. Typically, such recorder devices have application in customer study analysis, load survey work, load monitoring, automatic billing, data collecting and the like.

In load survey work, by way of example, the recorder device may be used to provide a data record which is of assistance to the utility company in its evaluation of the load conditions for the different types of customers, and further in the evaluation of the rate structures which are reasonably used for the types of loads involved.

The same recorder device may also be used to record information for billing purposes, whereby labor costs and possible errors in billing are reduced. In yet another application, such type recorder device may be used tO provide a detailed record of information which permits more accurate evaluation of system performance. By way of example, the system engineers for a utility company may find reason to be concerned about the coincident load values at two or more points in the electrical distribution system of such utility. In such instances, a recording device may be located at each point of service to record the information for each demand interval, and the sum of all loads during a demand interval can be readily determined by a careful and studied review of the recorded information.

In yet other instances, the utility engineers may be required to provide information which supports proposed rate schedules, or for justification of existing rate schedules, and the recorded data provided by the recorder device provides the basis for the establishment of fair and equitable rate assignments. These and other uses for and of recorder survey devices are well known in the field.

While pulse recorder equipment has been known heretofore for such purposes, there is a need for a more flexible and reliable type recorder unit which provides data records of such field information.

It is an object of the invention therefore to provide a device which is so operative, and specifically which has the ability to provide a magnetic tape recording of data relating to the load measured by a utility meter along with a time reference in a form which is compatible for use with available data processing equipment.

SUMMARY OF THE INVENTION

The survey recorder of the invention basically comprises a two-track cassette recorder including recorder circuitry having a first section responsive to low voltage data input pulses to record a data track on the cassette tape, and a second section responsive to timing pulses to provide a time track recording which identifies predetermined time intervals in which data recording occurs. NRZ recording format is used for the recording of both data and time information, a change in polarity occurring on the data track with the receipt of each data pulse input to the first section, and a change in polarity in the time track occurring with the input of each timing pulse input to the second section.

The data input source in a preferred embodiment comprises a novel pulse initiator circuit which utilizes a light-emitting diode and a phototransistor with solid state circuitry to detect each rotation of a meter disc. A Schmitt trigger is utilized for level sensing to reduce probabilities of the recording of false pulses due to irregularity to disc motion. A solid state divider driven by the Schmitt trigger output provides an arrangement whereby various pulse ratios may be programmed to the data section of the recorder circuitry.

A power output circuit generates a distinctive signal which is recorded on the time track only when a power outage of greater than twenty seconds duration occurs, whereby switching transients and voltage dips will not effect an improper indication of power outage.

The novel power outage code as provided by such circuit consists of (a) two one-half amplitude pulses of the same polarity immediately following one another, (b) the second one-half amplitude pulse of the pair occurring at the time of transition of the interval timing switch (c) half amplitude measurements which are determined by comparison of the relative amplitude of the incoming pulse to the average amplitude of the previous five pulses.

The survey recorder thus provides not only a reliable record of customer load and demand data, but additionally provides a reliable indication of any interruption in the continuity of the data recording.

SYSTEM DESCRIPTION

Figures 1, 1A, 1B:
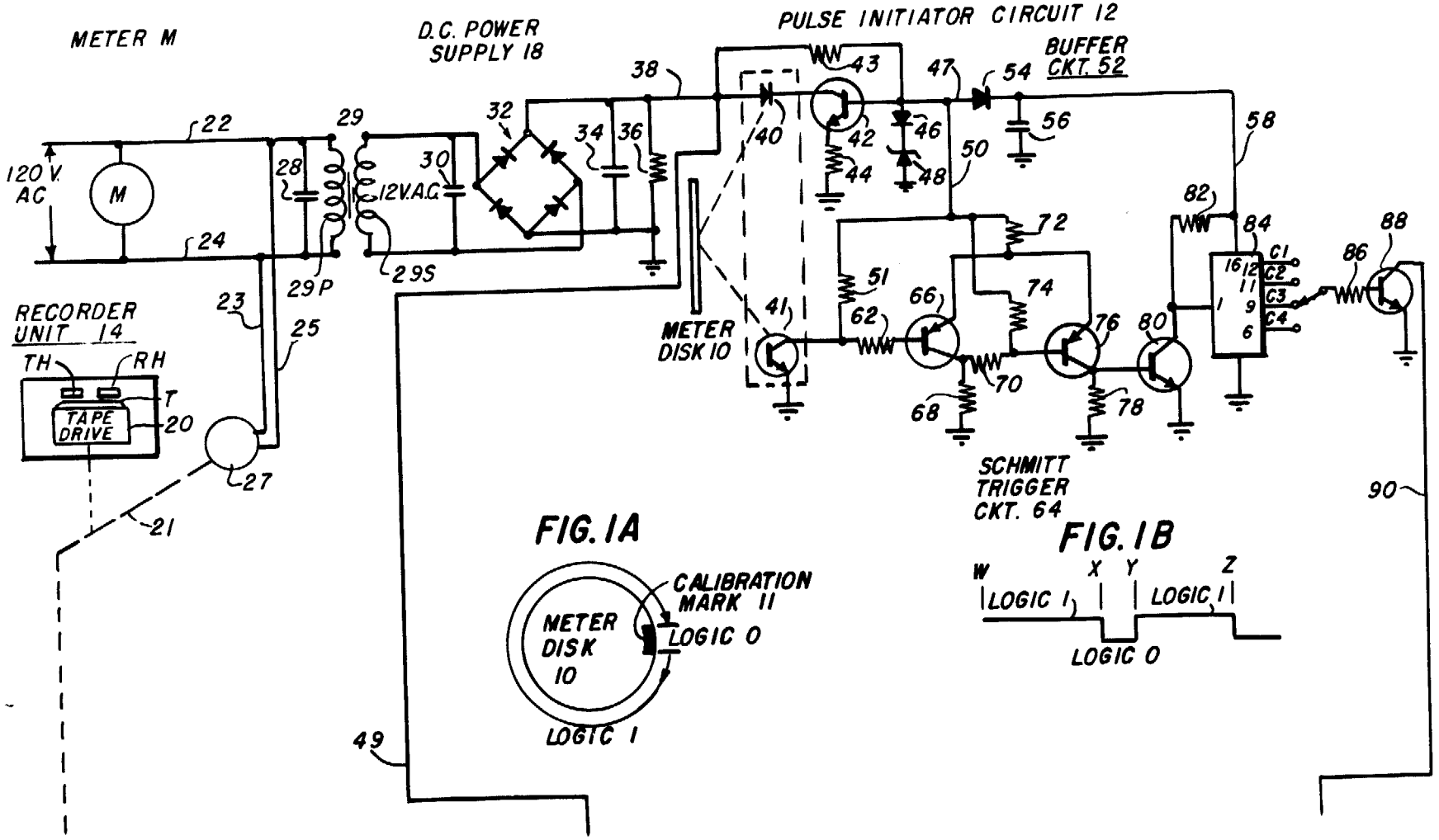
FIGS. 1 and 2, as placed in adjacent relation, set forth a preferred embodiment of the novel survey recorder.
FIG. 1A discloses a calibrated meter disc for use with the survey recorder.
FIG. 1B is a showing of the pulse output of the pulse initiator for one revolution of the meter disc.
Figure 2:
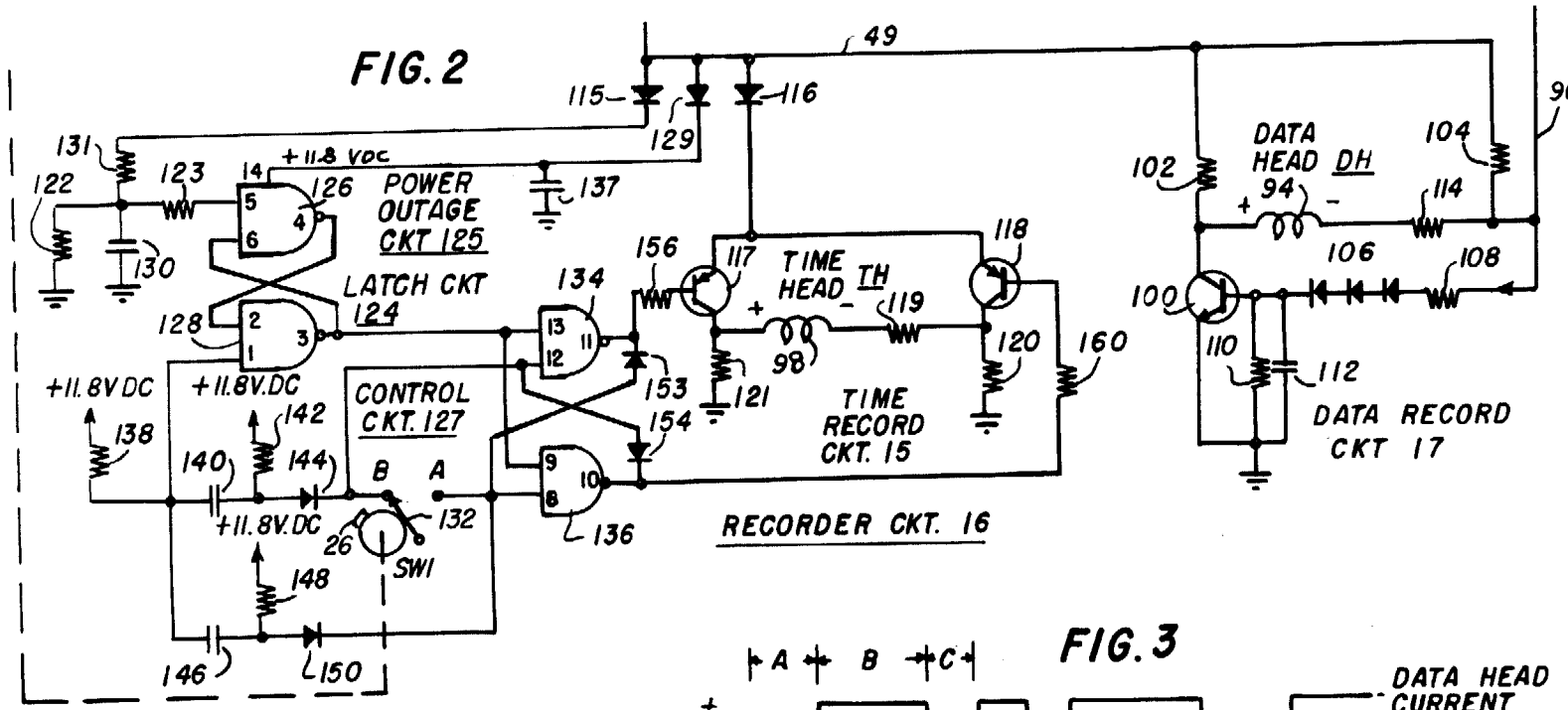

With reference to FIGS. 1 and 2, the survey recorder circuit 10 of the present disclosure basically comprises a watthour meter M arranged for connection to a 110 or 220 volt AC source for measuring the power used by a consumer, a synchronous motor 27 connected to the AC source for operating the tap drive 20 of a cassette tape recorder unit 14 via gear drive 21, and for also driving a cam 26 in the periodic generation of timing pulses, a DC power supply 18 connected to the AC source for providing DC power to the survey recorder circuitry, a pulse initiator circuit 12 for providing data pulses representative of the amount of power measured by the meter M, and a recorder circuit 16 including a time record circuit 15 and a data record circuit 17 for providing data and time signals to the two heads of the data and time record heads DH, TH of the recorder 14, a logic control circuit 127 for the time record circuit 15 and a power outage circuit 125.

DC Power Supply Source 18

DC power supply circuit 18 which is connected over conductors 22, 24 to the 120 volt (or 240 volt) AC source is operative to provide a 12.5 volt DC output over conductors 38 and 49 to the pulse initiator circuit 12 and the recorder circuit 16 respectively.

More specifically, conductors 22, 24 conduct the AC source to the primary winding 29P of a transformer 29 which provides a 12.5 volt AC output across its secondary winding 29S. Surge protector 28 is connected across the primary winding 29P, and capacitor 30 is connected over secondary winding 29S for the purpose of attenuating and filtering high frequency noises from the output of the transformer 29. The 12.5 volt DC output of the transformer 29 is rectified by full wave rectifier 32, the output of which in turn is filtered by capacitor 34, and applied across load resistor 36 to the DC supply conductor 38 for the pulse initiator 12 and over DC supply conductor 49 for the recorder circuit 16.

Sync Motor 27

Synchronous motor 27 has its input conductors 23, 25 connected directly across the AC source, and is continuously operable whenever AC power is input to the meter M. In one embodiment shown in the copending application of Murray C. Carney and David G. Hart, filed as of even date for Load Survey Recorder and assigned to the assignee of this invention, the sync motor 27 via gear train 21 drives the tape drive 20 of a cassette recorder to advance the tape T past the time record head TH and the data record head DH of recorder 14 at approximately 1/900 ips. Gear train 21 simultaneously drives a single lobe cam 26 (FIG. 2) which operates an associated microswitch SW1 to provide a timing pulse every 15 minutes of operation of the synchronous motor 22. As will be shown, such pulses in turn enable the control circuit 127 to control the time record circuit 15 to record a discrete timing signal on the cassette tape to indicate the times of occurrence of the 15 minute intervals, and further to indicate power outages which exceed 20 seconds in duration.

Pulse Initiator Circuit

Pulse initiator circuit 12 is operative with meter disc 10 of meter M to provide digital pulses to the recorder circuit 16, each of which represents a predetermined number of rotations of the meter disc 10 of the watthour meter M. As is known in the art, a conventional watthour meter, such as the type commercially available from Sangamo Electric Company, Springfield, Illinois, as a J4 meter, normally locates a dark zone 11 (see FIG. 1a) on the underside of the meter for use in meter calibration during meter assembly in the plant. In the present embodiment, pulse initiator circuit 12 includes a light-emitting diode 40 (FIG. 1) which is mounted to direct its light output toward the underside of meter disc 10 for reflection back to a phototransistor 41. In each revolution of the meter disc 10, as the black zone 11 is moved into the area of light engagement with the under surface of the disc 10, the reflected light is reduced significantly to the phototransistor 41.

In operation, the light output of the light-emitting diode 40 which is directed toward the meter disc 10 is normally reflected back to the phototransistor 41 to enable the phototransistor 41 to provide a first output signal. As the dark zone 11 on the disc 10 moves into the area of light output of diode 40, the absence of reflected light to the phototransistor 41 will cause the phototransistor 41 to provide a second or different signal output. As will be shown, the changing signal outputs of phototransistor 41 are used to generate data pulses which represent a count of the meter disc revolution for recording purposes.

More specifically, a light-emitting diode 40 is connected over conductor 38 to the 12.5 volt output of DC supply source 18, and via transistor 42 and resistor 44 to ground. Light emitting diode 40 therefore provides a light output whenever power is present at the 120 volt AC (or 240 volt) input. Transistor 42 connected in series with diode 40 operates in known manner to provide a constant current for the diode 40. Resistor 43 is connected to conductor 38 and provides current to the 5.1 volt Zener 48 and diode 46 which forms a constant voltage supply over conductors 47 and 50 to the components of the pulse initiator circuit 12. Diode 46 is connected in series with Zener diode 48 across the base-emitter circuit of transistor 42 in a temperature-compensating mode. With such an arrangement the normally negative temperature coefficient of the base to emitter junction of transistor 42 is compensated by the nagative temperature coefficient of diode 46.

The constant voltage on conductor 50 is connected to phototransistor 41 and a Schmitt trigger circuit 64, and the constant voltage on conductor 47 is connected over a buffer circuit 52 comprised of diode 54 and capacitor 56 and conductor 58 to integrated divider circuit 84. Buffer circuit 52 minimizes momentary flickers which may occur in the current supplied over conductor 58 to the programmable divider circuit 84, and thereby the possibility of false counts by the divider circuit.

Phototransistor 41 and diode 40 may be of the type commercially available as Fairchild FPA 103. Phototransistor 41 is located, as shown, to have its base element respond to the output light of diode 40 as reflected from the underside of meter disc 10. Phototransistor 41 conducts during the period that the light output of the diode 40 is reflected by the meter disc 10 to the base element of phototransistor 41, and is less conductive during the period that the dark zone reduces reflection of such light. The collector current output of transistor 41 is fed over resistor 62 to the input circuit for trigger circuit 64. The trigger circuit 63 includes a first transistor 66 having its emitter element connected over common emitter resistor 72 to constant voltage conductor 50, its base element connected over resistor 62 to the output of phototransistor 41, and its collector element connected over resistor 68 to ground. The collector of transistor 66 is also connected over resistor 70 to the base element of the second transistor 76 in the trigger circuit 64. Transistor 76 has its base element further connected over bias resistor 74 to the constant voltage supply conductor 50; its emitter element connected common with the emitter of transistor 66 over resistor 72 to the constant voltage conductor 50; and its collector connected over resistor 78 to ground, and also to the base of drive transistor 80.

Transistor 80 has its emitter element connected to ground, and its collector connected over resistor 82 to constant voltage conductor 58, and to input pin 1 of the divider circuit 84, which may be of the type commercially available from RCA as CD4024AE.

The output of divider circuit 84 may be taken from terminals 12, 11, 9, or 6 which respectively causes a change in the logic output after the input of 2, 4, 8, or 16 pulses to terminal 1 by the trigger circuit 64, whereby different pulse output rates may be selectively programmed by connecting the resistor 86 to correspondingly different ones of the outputs of divider 84. The selected output of divider 84 is fed over resistor 86 to amplifier transistor 88, and thence over output conductor 90 to the data track circuit 17 in recorder circuit 16.

Operation of Pulse Initiator Circuit 12

Meter disc 10 rotates as shown at a speed which is proportional to the amount of energy being used by the load. As noted above, the light output of light-emitting diode 40 is normally reflected by the underside of the meter disc 10 to the base of the phototransistor 41. Once in each such rotation of the meter disc 10, light is reflected from the light-emitting diode 40 to the phototransistor 41 to change the signal output of phototransistor 41 to trigger circuit 64.

During the period that the light output of light-emitting diode 40 is reflected to phototransistor 41 the collector voltage of phototransistor 41 is low, and such signal as applied to the base element of transistor 66 in the trigger circuit 64 drives transistor 66 into saturation. The collector voltage of transistor 66 in turn goes more positive, and the resultant positive-going signal at the base of transistor 76 causes transistor 76 to turn off. With transistor 76 turned off, the voltage of the collector of transistor 76 decreases, and the driver amplifier of transistor 80 likewise is turned off. With drive transistor 80 off, the voltage at the collector of transistor 80 is high (i.e., a logic 1 signal) and a logic 1 signal is input to the divider 84 (see logic 1, interval WX—FIG. 1B).

Assuming now that the meter disc 10 rotates to bring the dark zone 11 on the meter disc 10 into position to reduce the reflection of the light output from diode 40 to phototransistor 41, the transistor 41 turns off to provide a positive-going signal to the first transistor 66 of the trigger circuit 64. Transistor 66 turns off to thereby cause transistor 76 to turn on. The signal output to the base of transistor 80 is now positive-going and transistor 80 turns on to cause the voltage at its collector to drop, and provide a logic zero output to the input for divider circuit 84. Divider circuit 84 responds to the leading edge of each negative-going pulse by adding a count. The divider however does not respond (i.e., add a count) with the occurrence of each positive-going trailing edge which occurs as the dark zone 11 on the meter disc 10 moves out of the path of the light output of diode 40. At such time, the light output of diode 40 is once more reflected to transistor 41, the phototransistor 41 turns on, transistor 66 turns on, transistor 76 turns off, and transistor 80 turns off to provide the leading edge of a logic 1 pulse to divider circuit 84 (Y, FIG. 1B). As noted above, the divider circuit 84 does not respond to such signal. The trigger circuit 64 provides a logic 1 output to divider circuit 84 until the next time phototransistor 41 turns off by reason of the reduction of the reflected light by the dark zone 11 on meter disc 10.

As noted, divider circuit 84 adds a count for each negative-going pulse output from the trigger circuit 64. After a predetermined number of such counts are recorded, divider circuit 84 changes the signal output over circuits C1–C4. In the disclosed embodiment, divider 84 is programmable by suitable positioning of resistor 86 to provide a change in the pulse output for each 1, 2, 4 or 8 revolutions of meter disc 10. Thus, if the pulse output of divider circuit 84 over conductor C3 is a logic 0, the divider circuit will change such output to a logic 1 as the fourth negative going pulse is input to the divider circuit 84 from the trigger circuit 64.

The pulse output of divider circuit 84 is amplified by amplifier 88 and fed over a cable 90 to the data record circuit 17 in the recorder circuit 16.

A greater number of pulse ratios may be provided in conjunction with the solid state divider circuit by painting the disc with an additional number of dark zones. Thus, for example, 16 dark zones such as illustrated zone 11 may be located on the disc, whereby each of the seven stages of the divider circuit 84 may be used to provide pulse ratios of R/P=4, 2, 1, 0.5, 0.25, 0.125 and 0.0625.

An electronic multiplying circuit may also be used in conjunction with a different number of dark zones on the disc and the electronic divider circuit 84 to in effect provide any practical fractional pulse ratio desired. In such arrangement the output of the trigger circuit 64 detecting the multiple dark zones is fed to the divider circuit 84 as before and the output of the divider circuit is fed to a programmable multiplier circuit (not shown). The output of the multiplier circuit is in turn fed to transistor 88. The divider and multiplier circuit are preferably programmable so that integer division and multiplication from about 1 to 10 for various pulse ratios can be obtained. The unusual flexibility provided by such circuitry will be readily apparent to those skilled in the art.

The duration of the successive pulses output by pulse initiator circuit 12 (FIG. 1B) will vary in direct relation to the speed of rotation of the meter disc 10, which is, in turn, determined by the rate of power consumption by the load being measured.

Recorder Circuit 16

The recorder circuit 16 includes a data recorder head (DH) 94 for recording the data inpulses received over conductor 90 from the pulse initiator circuit on one track of the magnetic tape T, and a time record head (TH) 98 which provides a record of each 15 minute interval of operation of the watthour meter M.

Both date and time information are recorded in the NRZ (non-return to zero) format, a continuous direct current flow being provided over the recording head RH, TH whenever AC power is present on the power circuit being monitored. The direction of current flow over head 94 in the data record circuit 17, and therefore the polarity of the tape magnetization is controlled by the signals output over conductor 90 by the pulse initiator circuit 12. That is, with the input of each pulse over conductor 90 to the data record circuit 17 by pulse initiator circuit 12, the direction of current over data record head 94 is reversed to change the polarity of tape magnetization.

A chart (FIG. 3a) shows the current flow over the data head DH with the receipt of a representative set of pulses from pulse initiator circuit 12. It will be seen from FIG. 3a that the polarity of the current changes as each successive pulse is input from the pulse initiator circuit 12, the duration of each polarity pulse varying directly with the amount of power consumed by the user. That is, the rate at which the pulses output over conductor 90 by the pulse initiator circuit 12 vary directly with the amount of power being measured by the watthour meter M, and since the tape is driven at a fixed rate, the duration of the polarity pulse recorded will vary directly with the duration of the pulse input over conductor 90 and the amount of power being used.

Data Record Circuit

Data record circuit 17 basically includes a recording head 94 which has one end connected over resistance 102 to 12.5 DC volts on conductor 49, and its other end connected over resistors 114 and 104 to the 12.5 volt supply conductor 49. Transistor 100, which is operative to determine the direction of flow of current over the data recording head 94, includes a collector connected over resistor 102 to the 12.5 DC supply conductor 49, an emitter connected to ground, and a base connected over diodes 106, resistor 108 and resistor 104 to the 12.5 volt DC conductor 49, and a forward bias circuit including parallel resistor 110 and capacitor 112 connected across the base-emitter circuit of transistor 100 to ground. The base of transistor 100 is also connected over diodes 106, resistor 108 to the output conductor 90 of the pulse initiator circuit 12. Resistors 104, 108 and diodes 106 provide a 2-volt bias level which minimizes operation of transistor 100 in response to spurious noises which might appear on conductor 90 of the pulse initiator circuit 12. RC filter 110, 112 is a noise suppression circuit for further assisting in minimization of improper operation of transistor 100.

Data Recording

As noted above, data is recorded on the data track in an NRZ format, the data track circuit 17 being operative to effect reversal of the direction of current flow over data head 94 with each change in the polarity of the signal output over conductor 90 from the pulse initiator circuit 12.

It will be recalled that with each four revolutions of the meter disc, the signal output from the pulse initiator circuit 12 changes. Thus, if the signal on conductor 90 was a logic 0, the output signal on conductor 90 changes to logic 1 (and vice versa) with each four complete revolutions of the meter disc 10.

Assuming initially that the signal on conductor 90 is a logic 1 (see FIG. 1b) such signal as applied over resistor 108, diodes 106 to the base-emitter circuit of transistor 100 causes transistor 100 to turn on, and current flows over a path which extends from +12.5 volts DC over resistor 104, 114 and data head 94 (from minus to plus) and transistor 100 to ground. With such current flow over data head 94, a negative polarity signal is applied to the magnetic tape (pulse interval A in FIG. 3a).

Control transistor 100 remains in such condition for the period that four complete revolutions of meter disc 10 occur. At such time, the signal output from pulse initiator circuit 12 over conductor 90 changes to a logic 0, and the direction of current flow over data head 94 is reversed to provide a positive polarity signal to the magnetic tape (pulse interval B, FIG. 3b). That is, with the application of logic 0 over conductor 90 and resistor 108 and diodes 106 to the base emitter circuit of transistor 100, transistor 100 is biased off, and current flows over a path which extends from +12.5 volts DC over resistor 102, data head 94 (from plus to minus), resistor 114 through transistor 88 of pulse initiator circuit 12 to ground.

The plus to minus current flow continues during the period that four more revolutions of meter disc 10 occur at which time divider circuit 84 changes the state of its output to logic 0 to cause transistor 88 to be turned off, and thereby provide a logic 1 output over conductor 90 (pulse interval C—FIG. 3a) to turn transistor 100 on and cause the current to once more flow over data record head 94 from minus to plus.

Figure 3:
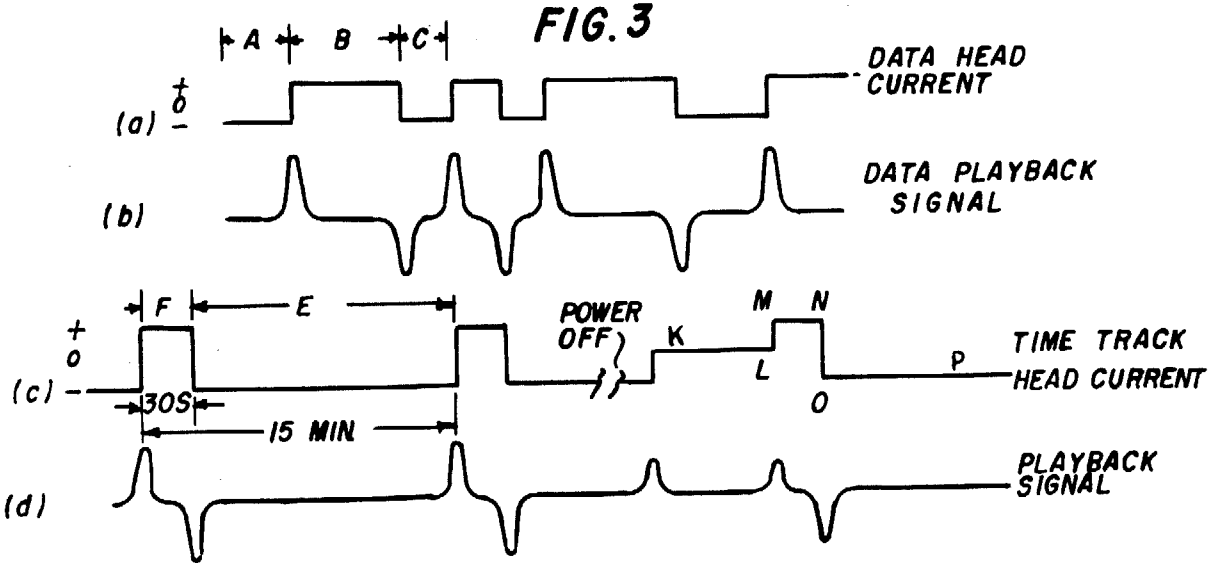
FIGS. 3A, 3C set forth representative current flows over data head and time head; and, FIGS. 3B, 3D set forth the playback waveforms which occur as a result of the current flow of FIGS. 3A, 3C over the data and track heads during recording.

By integrating the leading edge of each pulse on the data track, data playback signals, such as shown in FIG. 3b are provided, which signals give an accurate representation of the number of revolutions of meter disc 14.

As will now be shown, time information is recorded on a second track of tape T to provide a time reference for the recorded data, whereby the amount of power used in successive periods of time can be accurately determined from the playback signals.

Time Track Circuit 15

Synchronous motor 27 (FIG. 1) via gear train 21 drives a cam 26 to operate switch Sw1 to move switch arm 132 to open contacts B and close contacts A for approximately 30 seconds to initiate each 15 minute interval (see pulse interval F—FIG. 3c). As will be shown, with switch SW1 in its normal position (i.e., as shown in FIG. 2 switch arm 132 connects ground to contacts B), current flows over timer head 98 from right to left to provide a negative polarity signal for the tape time track. During the 30 second interval in which switch arm 132 closes contacts A the current flow over head 98 is from plus to minus to provide a positive polarity signal on the time track (see pulse interval F—FIG. 3c). At the end of the 30 second interval, cam 26 causes the switch arm 132 to once more connect ground to contacts B, and thereby reverse the direction of flow of the current over time period head 98 to provide a negative polarity signal to the time track for the next 14½ minutes (pulse interval E—FIG. 3c).

Time recording circuit 15 also includes a power outage circuit 125 which will not provide a record of power outages which are less than 20 seconds in duration, and which reestablishes current flow in the time record head 98 in the same direction as existed prior to the interruption. Power outage circuit 125 is further operative to recognize power interruptions which last more than 40 seconds, and when power returns to provide a distinctive marking signal on the track by preventing restoration of current flow over the time track head 98. During such period zero current level is applied to time head track 98 and a half amplitude pulse results (interval KL—FIG. 3c). As the switch SW1 operates to provide a pulse, as noted above, which initiates the end of 15 minutes of meter operation, the power outage circuit 125 operates to reestablish current flow through the time record head TH which by reason of the previous zero current level (interval KL—FIG. 3c) results in a second half amplitude pulse on the tape (interval LMN—FIG. 3c). At the end of the 30 second period MN, the timing pulse causes current flow to be reversed to provide a negative polarity pulse (interval NOP—FIG. 3c) and the system operates to record time pulses in the normal manner until a further power outage occurs.

The format recorded on the tape where a power outage occurs thus comprises two half amplitude pulses with a location and polarity which violate the requirements of a legitimate time pulse to thereby provide marking of power outages in a new and unusual pattern. In the playback format (FIG. 3d), the power outage code may be recognized by (a) the detection of two ½ amplitude pulses of the same polarity immediately following one another, (b) the second ½ amplitude pulse occurring at the time of the microswitch operation, (c)

and for reliability comparing the relative amplitude of the incoming pulse to the average amplitude of the previous five pulses. The operation of the time record circuit in the provision of such tape record is now set forth.

Time track circuit 15 basically comprises first and second current control transistors 117, 118 which are enabled in their operation by a control circuit 127, a power outage circuit 125, and switch SW1 in a manner to be described. Whenever control transistor 117 is caused to conduct, a path is established for the time record head 98 which extends from +12.5 volts DC on supply conductor 49 over diode 116, transistor 117 and in parallel over resistor 121 to ground, and over time record head 98 from plus to minus and over resistors 119, 120 to ground. Whenever control transistor 118 conducts, a current path is established for the time record head 98 which extends from +12.5 volts DC on supply conductor 49 over diode 116, transistor 118 and a parallel circuit including resistor 120 in one leg, and resistor 119, head 98 from minus to plus and resistor 121 to ground in the second leg.

To summarize, with control transistor 117 enabled, a positive polarity signal is recorded on the time track, and with control transistor 118 enabled, a negative polarity signal is recorded on the time track. If neither of the transistors 117, 118 is conducting, zero current is supplied to the time track.

Power Outage Circuit

The stage of transistors 117, 118 is controlled by control circuit 127, switch SW1 and power outage circuit 125. Power outage circuit 125 includes a timing capacitor 130 which is connected over resistor 131 and diode 115 to the 12.5 volts DC on conductor 49. A discharge resistor 122 is connected between the positive plate of capacitor 130 and ground, and the junction of resistors 131, 122 and capacitor 130 is connected over resistor 123 to terminal 5 of a latch circuit 124 which includes a pair of NAND gates 126, 128 connected in a latching configuration whenever output terminal 4 of gate 126 is connected to input terminal 2 of gate 128 and the output terminal 3 of gate 128 is connected to the input terminal 6 of gate 126. A power input terminal 14 on gate 126 in latch circuit 124 is also connected with capacitor 137 over diode 129 to the 12.5 volt DC on conductor 49.

Capacitor 137 furnishes DC power to the latch circuit 124 allowing it to operate for at least the first 40 seconds of loss of power on source conductor 49.

With reference to latch circuit 124, input terminal 1 on the second gate 128 of latch 124 is connected (a) over resistor 138 to 11.8 volt DC, (b) over capacitor 140 and diode 144 to contact B of switch SW1, and further to input terminal 12 of NAND gate 134, (c) over capacitor 146, diode 150 to contacts A of switch SW1 and further to input terminal 8 of NAND gate 136. The junction of capacitor 140 and diode 144 is connected over resistor 142 to 11.8 volts DC, and the junction of capacitor 146 and diode 150 is connected over resistor 148 to 11.8 volts DC.

The signal output of latch circuit 124 is connected to an input terminal of NAND gate 134 and NAND gate 136, the outputs of which directly control the state of transistors 117, 118.

Input terminal 12 on gate 134 is connected via diode 154 to the output of gate 136, and input terminal 8 of gate 136 is connected via diode 153 to the output of gate 134 to assist in maintaiing each gate 134, 136 in a known state while switch SW1 is making its transition from A to B or vice versa.

The output of gate 134 is connected via resistor 156 to the base element of transistor 117, a logic 0 output from gate 134 effecting conduction of transistor 117, and a logic 1 output effecting turnoff of transistor 117. In like manner, the output of gate 136 is connected via resistor 160 to the base element of transistor 118, the logic 1 output from gate 136, effecting turnoff of control transistor 118 and the logic 0 output effecting conduction of control transistor 118.

Operation of Time Record Circuit 15

As the circuitry is first connected to the 120 or 240 volt power source (or at such time as the power has been off for a period of over 40 seconds), transistors 117 and 118 will be turned off by reason of the reset condition of latch circuit 124 as will be shown.

As the 120 volt (or 240 volt) AC power is restored, capacitor 130 will begin to change over the path which extends from conductor 49 via diode 115, resistor 131 and capacitor 130 to ground. While capacitor 130 is charging, the voltage signal at terminal 5 of gate 126 will be significantly less than the 11.8 volts DC, and will in effect comprise a logic 0 signal input to terminal 5. Power supplied on terminal 14 of gate 126 via diode 129 will be 11.8 volts DC.

Since gate 126 is a NAND gate, with logic 0 at terminal 5 the output terminal 4 will be a logic 1 and terminal 2 of gate 128 will also be a logic 1, (i.e., with any input at logic 0, a NAND gate outputs a logic 1 and with both inputs at logic 1 a NAND outputs a logic 0).

Since 11.8 volts DC (logic 1) is also applied over resistor 138 to terminal 1 of NAND gate 128, both input terminals 1 and 2 are a logic 1 and output terminal 3 of gate 128 will be at logic 0. The logic 0 output of gate 128 is connected to (a) terminal 6 of gate 126, thus providing feedback to the latch circuit 124 (b) terminal 13 of gate 134, and (c) terminal 9 of gate 136.

With input terminal 13 at logic 0, the output of NAND gate 134 will be logic 1 and transistor 117 will be turned off. In like manner with input terminal 9 of NAND gate 136 at logic 0, the output of gate 136 will be logic 1 and transistor 118 will be turned off. With transistors 117 and 118 turned off, there will be no current flowing through the time recording head 98. Such circuit condition (i.e., zero level current flow over time record head 98) occurs whenever the AC power is first applied to the system, or whenever the power is restored after more than 40 seconds of a power outage, and such circuit condition continues to prevail until the next operation of switch SW1 by cam 26 and synchronous motor 27.

During such period after startup and prior to operation of switch SW1, the logic 0 output from gate 128 to terminal 6 of gate 126 holds latch circuit 124 stable in such condition (i.e., logic 0 output) even though capacitor 130 meanwhile charges to 11.8 volts DC to change the signal on terminal 5 of gate 126 from logic 0 to logic 1 (i.e., with logic 0 on terminal 6, the gate 126 will provide a logic 1 output).

Operation of Switch SW1

As synchronous motor 27 drives cam 26 to the camming position, a new 15 minute timing interval is initiated (and assuming the switch SW1 is in the illustrated contact position B) switch arm 132 is moved from contact B to contact A by cam 26 to provide a timing pulse to control circuit 127. That is, as switch arm 132 operates to close contacts A, ground is connected to the junction of diode 150 and terminal 8 on gate 134. With the connection of ground to contact A, such ground instantaneously appears via diode 150 and capacitor 146 at terminal 1 on gate 128 of latch circuit 124. With logic 0 on terminal 1 of gate 128, terminal 3 will output logic 1 to (a) terminal 13 of gate 134, (b) terminal 9 of gate 136 and (c) terminal 6 of latch gate 126.

Since terminal 5 of latch gate 126 was at logic 1, as terminal 6 of gate 126 goes to logic 1, the output terminal 4 of gate 126 outputs logic 0 to terminal 2 of gate 128 to maintain a logic 1 output from gate 128.

Simultaneous with connection of ground to contacts A, a charging circuit is completed for capacitor 146 which extends from +11.8 volts Dc over resistor 138, capacitor 146, diode 150, contacts A, and switch blade 132 to ground. Capacitor 146 starts charging towards +11.8 volts at a rate determined by the value of resistor 138 and capacitor 146. After a predetermined time determined by the RC characteristics of such circuit, capacitor 146 is fully charged and logic 1 appears at terminal 1 of gate 128. However, the state of such gate does not change since logic 0, as noted above, is input to terminal 2 by gate 126 of latch circuit 124 (and continues to be until such time as a power outage of greater than 40 seconds occurs).

Returning now to control gates 134, 136, as logic 1 is output by latch circuit 124 to terminals 13 and 9 of gates 134, 136, transistor 117 is turned on and transistor 118 is held off. That is, switch blade 132 at this time has connected ground (logic 0) over contact A to terminal 8 of NAND gate 136, and the output of gate 136 remains at logic 1, whereby transistor 118 remains in the off position.

However, the switch arm 132 in engagement with contact A, ground is removed from contact B, and a logic 1 signal is applied from the +11.8 volt DC source over resistor 142, and diode 144 to terminal 12 of gate 134. With logic 1 input to terminal 12, logic 0 is output from gate 134 over resistor 156 to the base of transistor 117 to turn on transistor 117.

As transistor 117 conducts, current flows from the 12.5 volts DC source conductor 49 over diode 116, transistor 117, and a parallel circuit having a first leg including resistor 121 to ground, and a second leg including resistor 119, time record head 98 from + to − and resistor 120 to ground to provide a positive polarity polarity pulse on the tape. With reference to the time track head current curve shown in FIG. 3c, such current flow is represented by the initial portion F of the waveforms shown thereat.

As described above, switch blade 132 is controlled to connect ground to contact A for a period of approximately 30 seconds, and during each such period the current flow over head 98 results in the recording of the first time pulse shown in the time track head current curve of FIG. 3c (pulse interval F).

As the timing interval of approximately 30 seconds is completed, the synchronous motor rotates cam 26 to move switch arm 132 from contact A and into engagement with contact B.

With reference first to latch circuit 124, the reconnection of ground to contact B by switch arm 132 results in an instantaneous logic 0 signal over capacitor 140 which appears at terminal 1 of gate 128. However, since the latch circuit is outputting logic 1 at the time by reason of the logic 0 on terminal 2, there will be no change in the logic 1 output of latch circuit 124 to terminal 13 of gate 134 and terminal 9 of gate 136.

With connection of ground over contacts B, logic 0 (ground) is also applied to terminal 12 of gate 134 (logic 1 is being applied to terminal 13 by latch circuit 124), and gate 134 will provide a logic 1 output over resistor 156 to the base of transistor 117 to turn off transistor 117, and thereby terminate the current flow from positive to negative over time track head 98.

Switch arm 132 in its engagement with contact B also completes a charging circuit for capacitor 140, which extends from +11.8 volts DC over resistor 138, capacitor 140 and diode 144, contacts B and switch arm 132 to ground. As capacitor 140 charges in the direction of +11.8 volts, the signal applied to terminal 1 of gate 128 changes to logic 1; however, latch circuit 124 continues to output logic 1 by reason of the logic 0 input to terminal 2 of gate 128 by gate 126.

Moreover, with the removal of ground by switch arm 132 from contacts A, a logic 1 signal is applied from the +11.8 volts source over resistor 148, diode 150 to terminal 8 of gate 136. With logic 1 input to both terminals 8, 9 of gate 136, the output of gate 136 changes to logic 0 which as applied over resistor 160 to the base of transistor 118, causes transistor 118 to conduct. A transistor 118 conducts, a current path is completed from +12.5 volts DC over diode 116, transistor 118, and time track head 98 (minus to plus) and a parallel circuit including a first leg comprised of resistor 119 and resistor 121 to ground, and a second leg including resistor 120 to ground.

The flow of current in such direction over time track head 98 results in a negative polarity pulse as shown in FIG. 3c for a period of approximately 14½ minutes, and at such time cam 26 operates switch arm 132 to cause ground to be connected to contacts A and provide a further positive pulse on the time track which initiates the start of a second 15 minute interval.

Such operation continues until such time as the tape on the cassette is exhausted, which, in the embodiment shown in the copending application, results in approximately 35 days of data accumulation.

Power Outage

As noted above, a novel power outage circuit provides a recorded indication of power interruptions which are in excess of 40 seconds. Power interruptions lasting more than 40 seconds nominally will be recognized as a true power outage condition and when the power returns, the power outage circuit prevents current flow over the time track head. At the time of generation of the next timing signal, the power outage circuit is reactivated and current through the record head is reestablished.

a. Power Interruption of Less Than 20 Seconds

Assuming that during normal operation of the device a power outage of less than 20 seconds occurs, capacitor 137 in the time record circuit 15 begins to discharge over latch circuit 124 and resistors 123 and 122 to ground. The tine constant of the RC circuit including capacitor 137, latch 124 and resistor 123, 133 is in the order of 40 seconds. Accordingly, latch circuit 124 will remain latched, and the control transistors 117, 118 do not change state. There is therefore no power outage signal recorded on the time track to indicate the occurrence of such momentary condition.

b. Power Outage of Over 20 Seconds

Assuming now that a power outage occurs for a period of greater than 20 seconds, capacitor 130 will discharge completely, and since a power outage has occurred, there will be no power to the circuit elements including time head 98. The circuit remains in such condition until power is once more reapplied. At such time, the power circuit 125 operates as initially described. Briefly, logic 0 on terminal 5 of gate 126 results in a logic 1 output from gate 126 to terminal 2 of gate 128. Gate 128 outputs logic 0, and latch circuit 124 is latched to continue to output logic 0 even though the signal input to terminal 5 of gate 126 later changes to logic 1 as capacitor 130 charges to its full capacity.

With logic 0 output by gate 128 to terminals 13 and 9 of gates 134, 136 respectively, the output of gates 134 and 136 are at logic 1 and transistors 117, 118 are turned off to interrupt the current flow over the time track head 98 until switch arm 132 is later operated by cam 26 to start a further timing interval.

With reference to FIG. 3c, the legend "Power Off" indicates the manner in which the signal recorded on the tape is interrupted as a power outage occurs, and the manner in which the signal level on the tape goes to zero to provide a first half pulse as power is returned (i.e., neither negative or positive polarity current flows during the period immediately following startup, since transistors 117 and 118 are maintained off until such time as the 15 minute interval switch SW1 is once more operated).

Assuming the switch was in the illustrated position with contact B closed at the time of the power outage, with the later closure of contact A by cam 26, the logic 0 signal via capacitor 146 to terminal 1 of gate 128 causes latch circuit 124 to output a logic 1 to terminals 9 and 13 of gates 134 and 136. As switch arm 132 closes contact A, gate 136 holds transistor 118 off, and gate 134 turns transistor 117 on to cause the current to flow over head 98 from positive to negative while the contact A is maintained closed, as shown at LMN in FIG. 3c, to thereby provide a second half amplitude pulse. After approximately 30 seconds of meter operation, switch arm 137 moves from contact A and engages contact B, and transistor 118 is turned on and transistor 117 is turned off to effect current flow over head 98 from negative to positive as shown at NOP in FIG. 3a.

At a time determined by the nature of the useage of this equipment the cassette tape is removed from the recorder and played back over tape processing equipment having a conventional playback head for the purpose of retrieving the recorded information. Assuming the information shown in FIGS. 3a and 3c has been recorded on the tape, the playback signal provided will be as shown in FIGS. 3b and 3d. It will be seen that a power outage is readily recognized from the characteristics of the playback signal.

After such information has been retrieved, the tape is subjected to an A.C. erasure to return the tape to a zero bias condition in preparation for reuse. As a precaution all tapes are A.C. erased before forwarding to the user.

We claim:

1. In a survey recorder for recording data and time information derived from an associated meter device, a pulse generator circuit for providing data pulses, each of which pulses represents a count derived from said associated meter device, timer means operative to provide time reference signals which represent predetermined intervals of time of operation of said meter device, recorder means including a data record circuit having a first recorder head winding for recording the data pulses provided by said pulse generator circuit on a magnetic tape, and a time record circuit having a second record head winding for recording time reference pulses on said magnetic tape as a reference for said data pulses, and a control circuit for said time record circuit including power outage means for detecting a power interruption to said meter device which is longer than a predetermined time duration, and logic means connected to said power outage means and said timer means for controlling said time record circuit and said second record head winding to record a discrete pulse format on said magnetic tape which identifies the power interruption.

2. A survey recorder as set forth in claim 1 in which said discrete pulse format provided by said control circuit comprises at least a first half amplitude pulse and a second half amplitude pulse recorded in sequence on said tape, at least one of which occurs simultaneous with one of said time reference signals output from said timer means.

3. A survey recorder as set forth in claim 1 in which said time record circuit comprises a first switching device connected between a source of potential and one side of said second record head winding, and a second switching device connected between a source of potential and the other side of said second record head, and in which said logic means includes a first and a second logic gate for controlling enablement and cutoff of said first and second switches respectively, each of said switching devices being operative as enabled to provide current flow over said second record head winding in opposite directions, whereby pulses of correspondingly opposite polarities are recorded on said magnetic tape as said switching devices are operated.

4. A survey recorder as set forth in claim 1 in which said logic means includes logic gate means connected to said timer means for providing signals to control said time record circuit to at times provide current over said second record head winding in a first direction, and to at other times control current flow over said second record head winding in an opposite direction, a latch circuit operative to a first state in response to application of power to said meter after a give period of power outage, said latch circuit in said first state providing output signals to said gate means to control said time record circuit to maintain zero level current to said second record head winding from the time of said application of power to said meter device until a further time reference signal is provided to said control circuit by said timer means.

5. A survey recorder as set forth in claim 4 which includes further means for operating said latch circuit to a second state in response to said further time reference signal from said timer means, said latch means providing a signal output in said second state which conditions said gate means to control said time record circuit to reverse the direction of current flow in response to receipt there-after of each time reference signal from said timer means.

6. A survey recorder as set forth in claim 1 in which said power outage means comprises a capacitor which prevents a change in the state of said time record circuit in response to power outages of less than a predetermined period.

7. A survey recorder as set forth in claim 1 in which said control circuitry includes a latch circuit for providing control signals to said time record circuit, and capacitor means for maintaining said latch circuit operative to output said control signals for a predetermined period after interruption of said power to thereby prevent operation of the time record circuit in response to momentary outage.

8. A survey recorder as set forth in claim 1 in which said logic means include a first and second gate for controlling operation of said time record circuit and timer means comprise a switch for connecting a signal alternately to a first input on said first and second gates, and in which said control circuit includes a latch circuit, an RC circuit connected to one input terminal for said latch circuit to provide signals indicating the presence and loss of power, a first marking circuit comprising a first capacitor and first diode connected between a second input of said first gate and a second input for said latch circuit, and resistance means connected between a potential source and the junction of said first capacitor and said first diode, a second marking circuit comprising a second capacitor and a second diode connected between a second input of said second gate and said second input of said latch circuit, and resistance means connected between potential source and the junction of said second capacitor and said second diode, and resistance means for connecting a potential to the junction of said first and second capacitor and said second input for said latch circuit, and in which said time record circuit comprises a first and a second transistor, and means for connecting the output of said first gate to control operation of said first transistor and means for connecting the output of said second gate to control operation of said second transistor.

9. A survey recorder as set forth in claim 1 in which said pulse generator circuit includes first means for providing a signal output to indicate each count output by said meter, a trigger circuit connected to the output of said first means operative to alternate states in response to receipt of each successive signal from said first means, a divider circuit connected to the output of said trigger circuit operable to add a count only when said trigger circuit [appears] *operates* to a predetermined one of said states to provide a predetermined signal, a plurality of output circuits for said divider circuit, each of which output circuits provides a pulse output in response to an input of a different number of said predetermined signals by said trigger circuit, and selection means for selectively connecting a different one of said divider circuits to said data record circuit.

10. A survey recorder as set forth in claim 9 in which said meter device includes a rotating disc which has a reflective surface and a nonreflective section on said surface and said pulse generator circuit comprises means for projecting a light in the direction of said reflective surface, pickup means for providing a first signal output in response to the detection of light reflected from said surface and a second signal output responsive to interruption of the reflected light by said nonreflected section, and said trigger circuit is connected to the output of said pickup means and operative to a first state in response to said first signal and operable to a second state responsive to said second signal.

11. A survey recorder as set forth in claim 9 in which said data record includes a control transistor which is operative to complete a current path over the first record head winding in one direction in response to a first pulse output from said divider circuit, and a current path over the first record head winding in an opposite direction in response to a second signal output from said divider circuit.

12. In a survey recorder for recording data and time information for use with a meter device having a rotating disc which has a reflective surface and a nonreflective section on said surface, a pulse initiator circuit comprising means for projecting a light in the direction of said reflective surface, pickup means for providing a first signal output in response to the detection of light reflected from said surface and a second signal output responsive to interruption of the reflected light by said nonreflected section, a trigger circuit connected to the output of said pickup means operative to a first state in response to said first signal and operable to a second state responsive to said second signal, a divider circuit connected to the output of said trigger circuit operable to add a count whenever said trigger circuit operates to a predetermined one of said states to provide a predetermined signal, a plurality of output circuit for said divider circuit, each of which output circuits provides a pulse output for a different number of said predetermined signals input from said trigger circuit, a pulse recording circuit and selection means for selectively connecting a different one of said divider output circuits to said pulse recording circuit.

13. A survey recorder as set forth in claim 12 in which said pulse output by said divider circuit at times comprises a logic 1 signal and at other times comprises a logic 1 signal and at other times comprises a logic 0 signal, and which includes a data record circuit comprising a data record head and a switching device which is operative in response to one of said pulses to effect the conduction of current over said data record head in a first direction, and operative in response to a different one of said pulses to effect control of the current over said record head in the opposite direction.

14. A survey recorder as set forth in claim 12 in which said rotating disc includes a plurality of nonreflection sections on said surface to provide a correspondingly different pulse ratio output to said pulse recording circuit.

15. In a survey recorder for recording data and time information derived from an associated meter device, which survey recorder includes timer means operative to provide time reference signals which represent predetermined intervals of time of operation of said meter device, a time record circuit having a record head for recording said time reference signals on a magnetic tape, a control circuit for said time record circuit including power sensor means for detecting the presence of power and the interruption of power to said meter device for a predetermined time period, logic means connected to said power outage means and said timer means for controlling said time record circuit and said record head to record a discrete pulse format on said magnetic tape which identifies a detected power outage comprising at least a first and a second half amplitude pulse of the same polarity recorded in sequence on said tape, at least one of which occurs simultaneous with one of said time reference signals ouput from said timer means.

16. A survey recorder as set forth in claim 15 in which said logic means includes gate means connected to said timer means for providing signals to control said time record circuit to at times provide current over said record head in a first direction, and to at other times control current flow over said record head in a second direction, a latch circuit operative to a first state with the detection of poawer by said power sensor means for a given period, said latch circuit being operative in said first state to provide output signals to said gate means to control said time record circuit to maintain zero level current to said record head from the time of the detection of power until a further time reference signal is provided to said logic means by said timer means.

17. A survey recorder as set forth in claim 16 which includes further means for operating said latch circuit to a second state in response to said further time reference signal from said timer means, said latch circuit being operative to provide a signal output to said logic means in said second state which conditions said gate means to control said time record circuit to reverse the direction of current flow in response to receipt thereafter of each time reference signal from said timer means.

18. In a survey recorder for recording data and time information derived from an associated meter device, which survey recorder includes timer means operative to provide time reference signals which represent predetermined intervals of time of operation of said meter device, a time record circuit having a record head for recording said time reference signals on a magnetic tape, a control circuit for said time record circuit including power sensor means for detecting the presence of power and the interruption of power to said meter device for a predetermined time period, and logic means connected to said power outage means and said timer means for controlling said time record circuit and said record head to record a discrete pulse format on said magnetic tape which identifies a detected power outage.

*19. A data recorder for recording metering information of a measured quantity subject to an interruption during an outage condition, comprising: a data input for receiving pulses responsive to predetermined amounts of a measured quantity; a time impuse control means actuated at regular time intervals; a switching control means having one conductive condition in response to presence of said measured quantity and an opposite conductive condition in response to the absence of said measured quantity; a data recording circuit means connected to said data input to generate data recording pulses; a time recording circuit means including said time impulse control means to generate time interval recording pulses in response to each actuation of said time impulse control means; an outage indicating circuit means including said switching control means, said outage indicating circuit means being connected to said time recording circuit means to generate a separate outage recording pulse in said time recording circuit in response to said switching control means being operated between said one and said opposite conductive conditions such that said outage recording pulse is produced in a predetermined relationship with respect to a time interval pulse generated immediately after an outage condition in said measured quantity.*

*20. A data recorder for recording metering information of a measured quantity subject to an interruption during outage conditions, comprising: a data input for receiving pulses responsive to predetermined amounts of a measured quantity; a time impulse control means actuated at regular time intervals; an outage detector including a switching control means having one conductive condition in response to presence of said measured quantity and opposite conductive condition in response to the absence of said measured quantity; a data recording circuit means connected to said data input to generate data recording pulses; a time recording circuit means including said time impulse control means; an outage indicating circuit means including said switching control means, said outage indicating circuit means being connected to said time recording circuit means to generate a separate outage pulse in said time recording circuit in response to said switching control means being operated between said one and said opposite conductive conditions such that said outage pulse is produced in said time recording circuit means in a predetermined relationship prior to a time interval pulse generated subsequent to an outage condition in said measured quantity.*

*21. In a recorder for recording data and time information derived from an associated meter device, timer means, a time record circuit having a record head responsive to said timer means for recording time reference signals representing predetermined intervals of time of operation of said meter device on a magnetic tape, and means responsive to said timer means and to interruption of power to said meter device for a predetermined time period for controlling said time record circuit and record head to record a discrete pulse format on the magnetic tape which identifies a detected power interruption of said predetermined time period.*

*22. The recorder of claim 21 wherein said discrete pulse format comprises a transition characteristic of a detected power interruption in a predetermined relationship to a transition of the time reference signals.*

*23. The recorder of claim 21 wherein said discrete pulse format comprises a transition characteristic of a detected power interruption in a predetermined time relationship to a transition of the time reference signals.*

*24. The recorder of claim 23 wherein said power interruption characteristic transition has an amplitude which is distinctly different from said time reference signal transition. i*

*25. In a recorder for recording data and time information derived from an associated meter device, timer means, a time record circuit having a record head and responsive to said timer means for recording time reference signals on a magnetic tape which represent predetermined intervals of time of operation of said meter device, and means for detecting the interruption of power to the meter device for a predetermined time and producing a signal characteristic of the occurrence of such power interruption in response to operation of said timer means after the power has returned to the meter device, said time record circuit being responsive to the characteristic signal to record a discrete pulse format on said magnetic tape which identifies the detected power interruption.*

*26. In a recorder for recording data and time information derived from an associated meter device, timer means, a time record circuit having a record head and responsive to said timer means for recording said time reference signals on a magnetic tape which represent predetermined intervals of time of operation of said meter device, and a control circuit for said time record circuit comprising means switchable to a first state in response to interruption of power to the meter device for a predetermined time period, for switching from the first state thereof to a second state in response to said timer means after power is returned to the meter device, said time record circuit being responsive to said switching from the first to the second state to record a discrete pulse format on the magnetic tape which identifies the detected power interruption.*

* * * * *